No. 764,027. PATENTED JULY 5, 1904.
G. A. ZUNDEL.
SOUNDER FRAME.
APPLICATION FILED MAR. 18, 1903.
NO MODEL.

WITNESSES
John A. Rennie
Henry J. Suhrbier

INVENTOR
Gustave A. Zundel,
By Goepel & Niles,
ATTORNEYS

No. 764,027.

Patented July 5, 1904.

UNITED STATES PATENT OFFICE.

GUSTAVE A. ZUNDEL, OF NEW YORK, N. Y.

SOUNDER-FRAME.

SPECIFICATION forming part of Letters Patent No. 764,027, dated July 5, 1904.

Application filed March 18, 1903. Serial No. 148,293. (No model.)

*To all whom it may concern:*

Be it known that I, GUSTAVE A. ZUNDEL, a citizen of the United States, residing in New York, borough of Manhattan, in the State of New York, have invented certain new and useful Improvements in Sounder - Frames, of which the following is a specification.

The object of this invention is to provide a telegraph bearing member which is of cheap and durable construction and which does not require the use of adjusting-screws for the bearings of the sounder-arbor, so that these bearing-screws may be done away with entirely in telegraph instruments of the cheaper grades, such as learners' sets.

For this purpose the invention consists of a bearing member composed of a base portion and upwardly - extending laterally - yielding spring-actuated bearing-standards at the sides of said base, said standards being provided at their upper ends with openings or sockets adapted to receive the ends of the arbor of the sounder.

Figure 1:
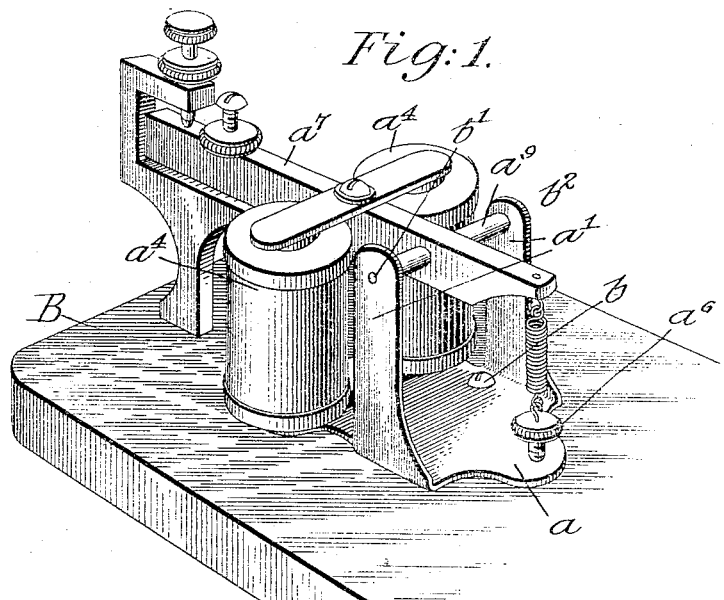
Figure 2:
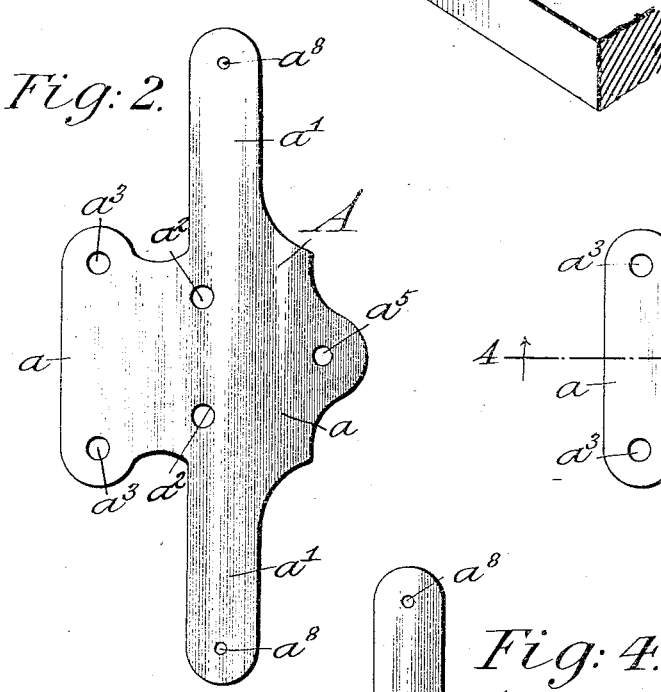
Figure 3:
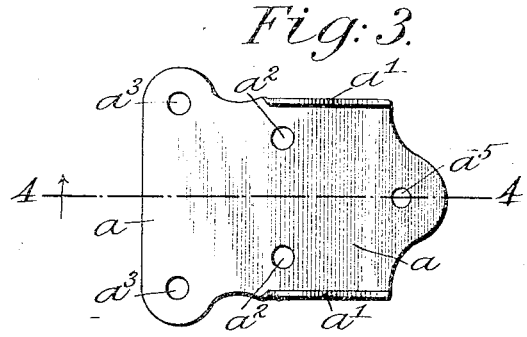
Figure 4:
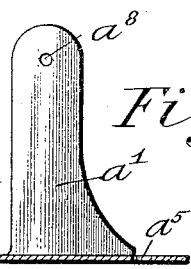

In the accompanying drawings, Figure 1 is a perspective view of a sounder provided with my improved sounder-frame. Fig. 2 is a plan view of the blank from which the bearing member is formed. Fig. 3 is a top view of the completed bearing member; and Fig. 4 is a vertical longitudinal section on line 4 4, Fig. 3.

Similar letters of reference indicate corresponding parts.

Referring to the drawings, A represents the blank from which my improved bearing member is formed. Said blank is composed of sheet metal, preferably sheet-iron of approximately one-sixteenth of an inch in thickness and having a slight spring tension. The blank is cut, stamped, or otherwise produced from the sheet. Said blank consists of a body portion $a$ and two laterally-extending arms $a'$. Said arms extend in opposite direction from opposite sides of the body portion $a$. The body portion is provided approximately in line with said arms with two openings $a^2$ to receive suitable fastening-screws for securing the completed bearing member to the base B of the telegraph instrument. At one side of said arms said base is also provided in its corner portions with two openings $a^3$, adapted to receive suitable screws by which the electromagnets $a^4$ are subsequently secured to the completed bearing member. At the opposite side of said blank A is a threaded opening $a^5$, adapted to receive an adjusting-screw $a^6$ for the armature-bar $a^7$. In the ends of the arms $a'$ are arranged bearing-sockets $a^8$, adapted to receive the ends of the arbor $a^9$ of the armature-bar $a^7$, and thereby form bearings for the same in the completed bearing member. For forming the bearing member from said blank the arms $a'$ are bent into upright position, as clearly indicated in Figs. 1, 3, and 4. When thus bent up, said arms stand substantially parallel and vertical and the bearing-sockets $a^8$ are located opposite each other. The frame thus formed is applied to the base B of the sounder by means of screws $b$ passing through the openings $a^2$. The bearing-standards which the arms $a'$ now form have a slight spring tension. The ends or journals $b'$ of the sounder-arbor $a^9$ are inserted into the sockets $a^8$ by first springing apart said bearing-standards at their upper ends sufficiently to permit entrance of the arbor between them and into the sockets and then permitting said standards to return to their original position, which they normally maintain, thereby reliably supporting the arbor. In order to prevent lateral play of the arbor in the bearings, the bearing ends $b'$ of the same are of a reduced size—*i. e.*, smaller than the body of the arbor, or at all events smaller than that portion of the arbor adjacent said reduced ends. Said body portion $b^2$ thereby prevents lateral play or movement of the arbor in the bearings $a^8$ of the bearing-standards.

Having thus described my invention, I claim as new, and desire to secure by Letters Patent—

1. The combination, with an armature-bar having an arbor, of a pair of standards having sockets in which the ends of said arbor are journaled, one of the standards being yieldingly supported to thereby permit its socket end to be moved away from the other standard and disengage the arbor and to cause it to return to normal position when released, substantially as set forth.

2. The combination, with an armature-bar having an arbor, of a pair of standards mounted on the base and having sockets in which said arbor is journaled, the standards being yieldingly supported to thereby permit their socket end to be moved away from each other and disengage the arbor and to cause it to return to normal position when released, substantially as set forth.

3. The combination, with an armature-bar having an arbor, of a bearing member, comprising a base portion and two integral standards on opposite parts of the base, the standards having sockets in which the said arbor is journaled, the bearing member being made of resilient metal and thereby permits the standards to yield and bend away from each other for the insertion and removal of the spindle and to spring back to normal position when released, substantially as set forth.

In testimony that I claim the foregoing as my invention I have signed my name in presence of two subscribing witnesses.

GUSTAVE A. ZUNDEL.

Witnesses:
HENRY J. SUHRBIER,
PAUL GOEPEL.